(12) United States Patent
Yeum (10) Patent No.: US 7,735,930 B2
(45) Date of Patent: Jun. 15, 2010

(54) WIDTH CONTROL DEVICE OF ARMREST FOR VEHICLES

(75) Inventor: Jun Sun Yeum, Hwaseong-Si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 12/326,406

(22) Filed: Dec. 2, 2008

(65) Prior Publication Data
US 2009/0152926 A1 Jun. 18, 2009

(30) Foreign Application Priority Data
Dec. 18, 2007 (KR) .................. 10-2007-0133101

(51) Int. Cl.
*B60N 2/46* (2006.01)

(52) U.S. Cl. .................. 297/411.37; 297/411.2; 297/411.32; 297/411.35; 297/411.46

(58) Field of Classification Search .............. 297/411.2, 297/411.32, 411.35, 411.37, 411.46, 188.14, 297/188.15, 188.16, 188.17, 188.19, 188.21, 297/115
See application file for complete search history.

(56) References Cited

U.S. PATENT DOCUMENTS

| | | | | |
|---|---|---|---|---|
| 1,802,620 | A | * | 4/1931 | Scully .................. 297/411.32 |
| 7,104,609 | B2 | * | 9/2006 | Kim .................. 297/411.35 |

* cited by examiner

*Primary Examiner*—Rodney B White
(74) *Attorney, Agent, or Firm*—Edwards Angell Palmer & Dodge LLP; Peter F. Corless (57) ABSTRACT

Disclosed herein is a width control device which automatically controls the width of an armrest, provided in a seat of a vehicle, in response to the body type of a passenger, thus enabling the passenger to sit in a comfortable position.

13 Claims, 8 Drawing Sheets

FIG.1

PRIOR ART

WIDTH CONTROL DEVICE OF ARMREST FOR VEHICLES

CROSS-REFERENCE TO RELATED APPLICATIONS

This application claims under 35 U.S.C. §119(a) priority to Korean Application No. 10-2007-0133101, filed on Dec. 18, 2007, the disclosure of which is incorporated herein by reference in its entirety.

BACKGROUND OF THE INVENTION

1. Field of the Invention

The present invention relates generally to width control devices of armrests for vehicles and, more particularly, to a width control device of an armrest for a vehicle which controls the width of the armrest, which is provided in a seat of the vehicle.

2. Background Art

Generally, armrests, provided on consoles in vehicles or provided on rear seats, are an accessory in the vehicle that allows passengers who sit in the corresponding seats to place their arms thereon, thus providing the passenger with a comfortable ride.

Figure 1:
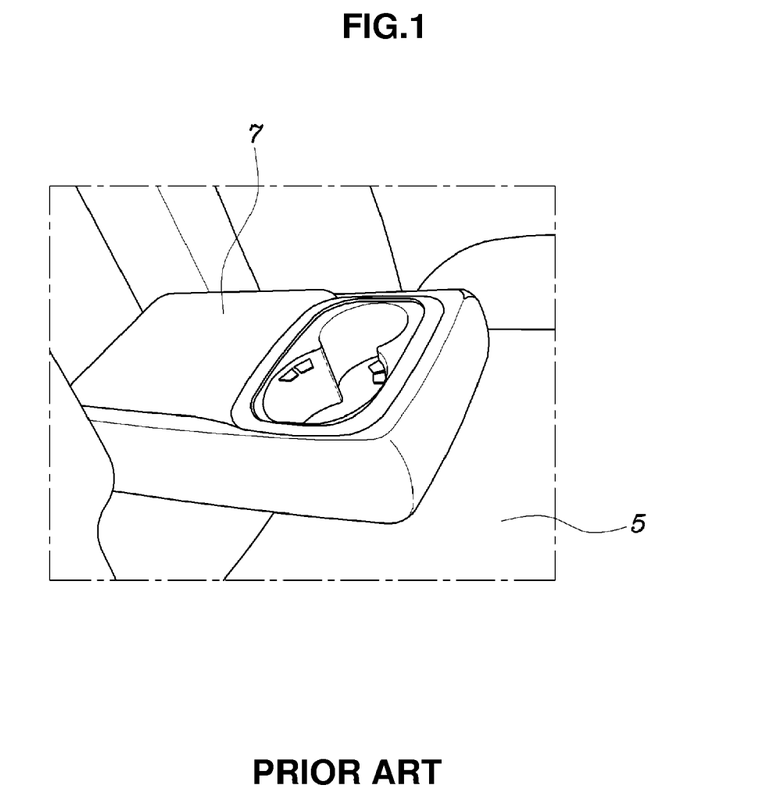
FIG. 1 is a perspective view showing a typical armrest provided in the rear seat of a vehicle, according to a conventional technique.

Armrests that are provided on the consoles are stationary types, and are thus unmovable. However, as shown in FIG. 1, an armrest 7, that is provided on a rear seat 5, is freely rotatable. Therefore, when the armrest 7 is not in use, it is placed in an upright state, and, when use of the armrest 7 is desired, it is rotated downwards and maintained in a horizontal state.

Such a conventional armrest for rear seats has been developed so that the height is suitably adjustable so as to avoid an inconvenience that may be caused when the height of the seated passenger is considerably large or small compared to an armrest.

Generally armrests are designed preferably such that only the height is adjustable in response to the height of the passenger seated in the rear seat, and further without taking into account whether the user is thin or fat.

Accordingly, the conventional armrest, provided in the rear seat, is adjustable only in height but has no means for adjusting the width.

As such, the conventional armrest for rear seats has a fixed width and does not take various body types of passengers, that is, whether the passengers are thin or fat, into account. Therefore, there is a problem in that it may be inconvenient for a passenger to place his/her arm on the armrest.

The above information disclosed in this the Background section is only for enhancement of understanding of the background of the invention and therefore it may contain information that does not form the prior art that is already known in this country to a person of ordinary skill in the art.

SUMMARY OF THE INVENTION

In one aspect, the present invention is directed to a width control device which automatically controls the width of an armrest, preferably provided in a seat of the vehicle, in response to the body type of a passenger, thus suitably enabling the passenger to sit in a comfortable position.

In preferred embodiments, the present invention provides a width control device for automatically controlling the width of an armrest provided in a seat in a vehicle, the width control device including, but not limited to, a main armrest; subsidiary armrests preferably provided in respective opposite sides of the main armrest so as to be slidable in opposite directions based on the main armrest; a screw bar to suitably push or pull each of the subsidiary armrests depending on the rotation of a first gear; a rotating shaft preferably provided with a second gear, which engages with the first gear of the screw bar to suitably rotate in conjunction with the first gear; a reversible motor to preferably reversibly rotate the rotating shaft; a support member suitably fastened to the main armrest for supporting the screw bar and the reversible motor; and a switch suitably provided in the front part of the main armrest to control the extraction or retraction of the subsidiary armrests from or into the main armrest.

In another preferred embodiment of the present invention, the width control device may further include a roller, which is suitably provided in the lower end of each subsidiary armrest to make the extraction or retraction movement of the subsidiary armrests smooth.

In further preferred embodiments, a bracket for supporting the reversible motor may be suitably provided on the support member.

In additional embodiments, the width control device may further include a sensor, which is preferably provided in the lower end of the main armrest to suitably sense the distance by which the main armrest is spaced apart from the bottom of the seat, such that, when the main armrest is moved away from the bottom of the seat by a suitably predetermined distance, the subsidiary armrests are automatically retracted into the main armrest.

According to other further embodiments, the sensor may be set such that, when the main armrest is moved away from the bottom of the seat, for example by a distance of 5 cm, 10 cm, 15 cm, 20 cm or more, preferably 10 cm or more, the subsidiary armrests are suitably retracted into the main armrest.

In other embodiments, the width control device may further preferably include a guide member, which supports and guides the subsidiary armrests when the subsidiary armrests, which are preferably movably provided on respective opposite sides of the main armrest, are suitably extracted from the main armrest.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum).

As referred to herein, a hybrid vehicle is a vehicle that has two or more sources of power, for example both gasoline-powered and electric-powered.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other objects, features and advantages of the present invention will be more clearly understood from the following detailed description taken in conjunction with the accompanying drawings, which are given hereinafter by way of illustration only, and thus are not limitative of the present invention, and wherein.

DESCRIPTION

As described herein, the present invention includes a width control device of an armrest for vehicles, comprising a main armrest, subsidiary armrests provided in respective opposite sides of the main armrest, a screw bar to push or pull each of the subsidiary armrests depending on rotation of a first gear, a rotating shaft, a reversible motor to reversibly rotate the rotating shaft, a support member, and a switch provided in a front part of the main armrest to control extraction or retraction of the subsidiary armrests from or into the main armrest.

In one embodiment, the main armrest is provided at a center position in a rear seat so as to be rotatable between an upright position and a horizontal position.

In another embodiment, the rotating shaft is provided with a second gear engaging with the first gear of the screw bar to rotate in conjunction with the first gear.

In a further related embodiments, the support member is fastened to the main armrest for supporting the screw bar and the reversible motor.

The invention can also include a motor vehicle comprising the width control device of an armrest as described in any one of the aspects herein.

Hereinafter, preferred embodiments of a width control device of an armrest for vehicles according to the present invention will be described in detail with reference to the attached drawings.

Figure 2:
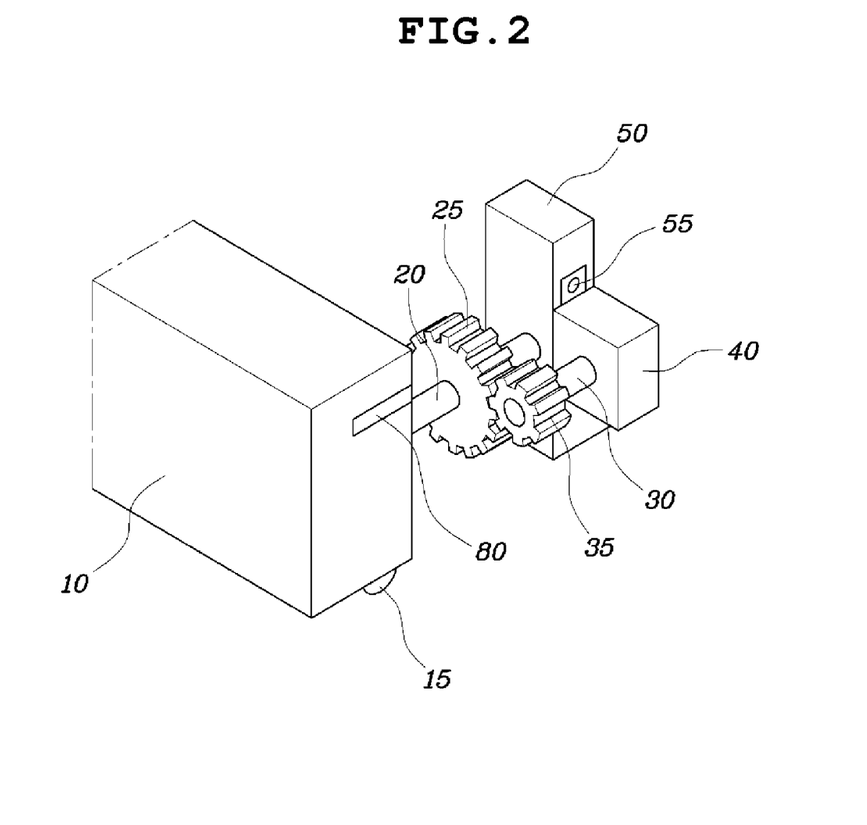
FIG. 2 is a schematic perspective view illustrating a width control device of an armrest for vehicles, according to the present invention.
Figure 3:
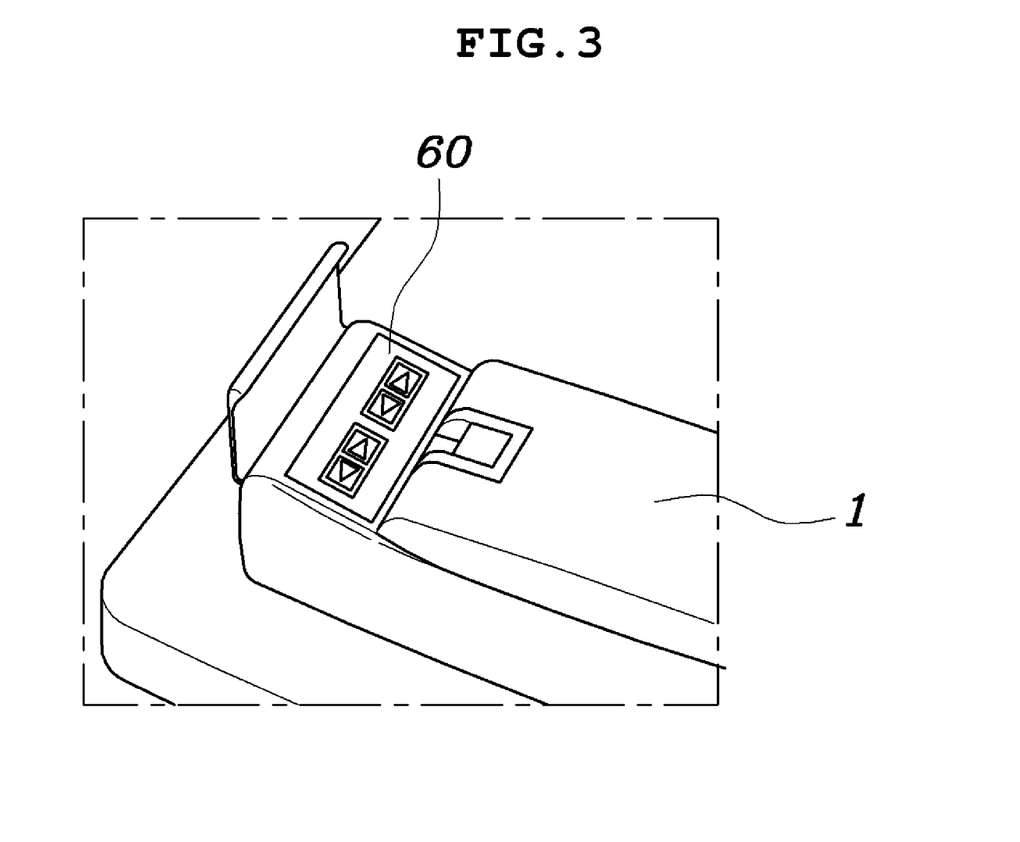
FIG. 3 is a schematic view illustrating the installation of a switch of the width control device according to the present invention.
Figure 4:
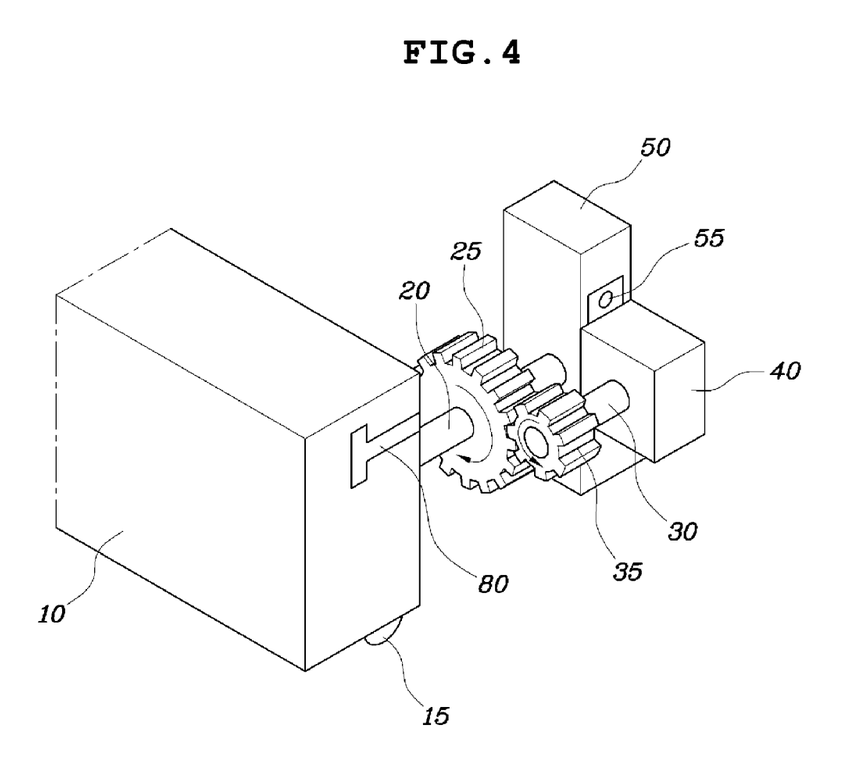
FIG. 4 is a perspective view illustrating the operation of the width control device according to the present invention.
Figure 5:
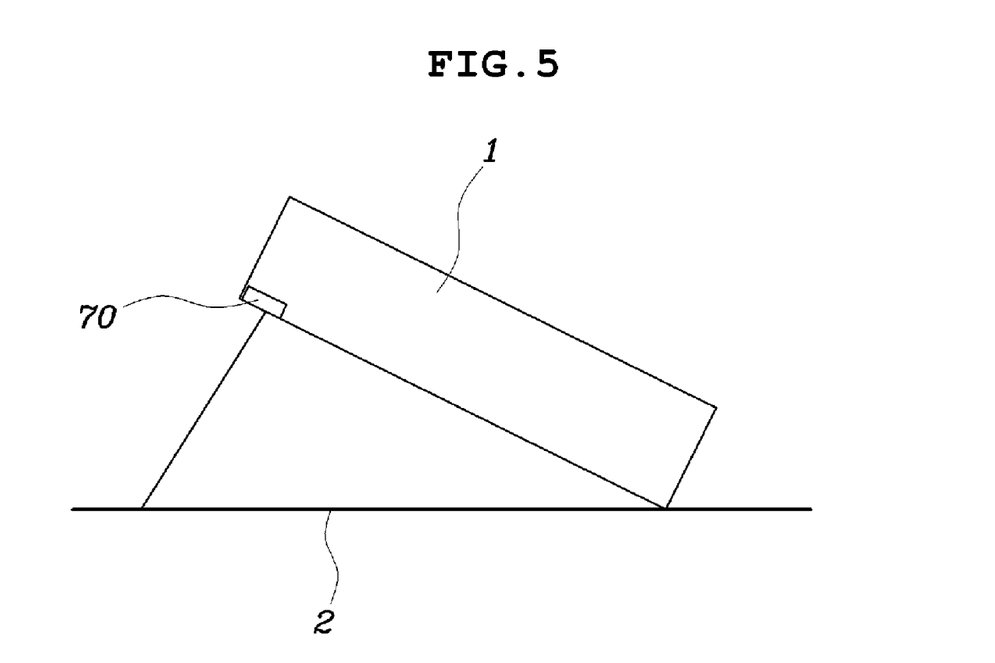
FIG. 5 is a schematic sectional view illustrating the operation of a sensor of the width control device according to the present invention.
Figure 6:
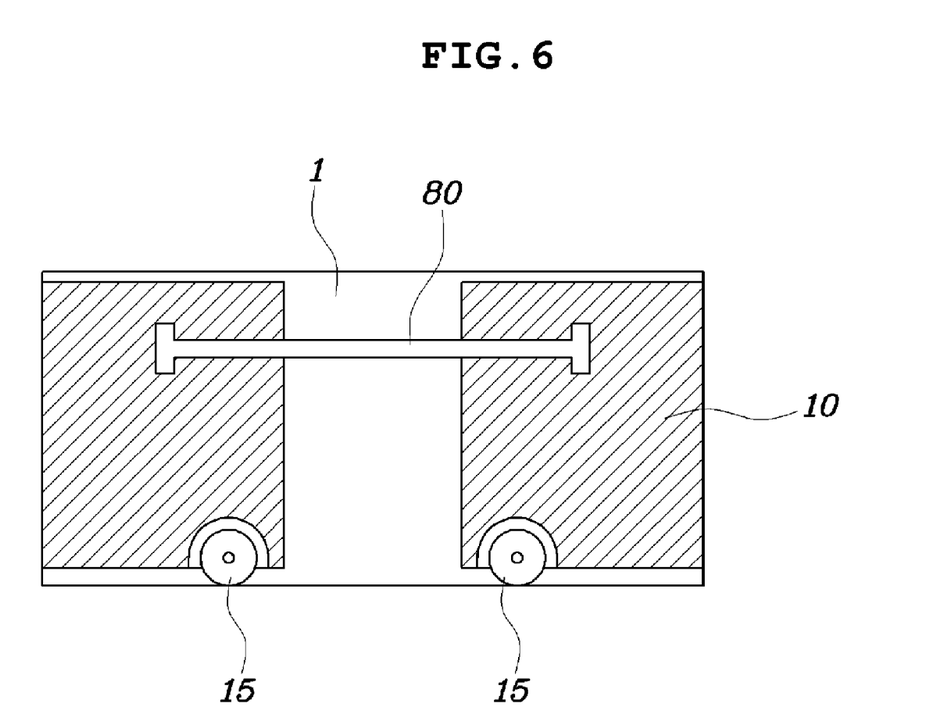
FIG. 6 is a sectional view illustrating a guide member of the width control device according to the present invention.
Figure 7:
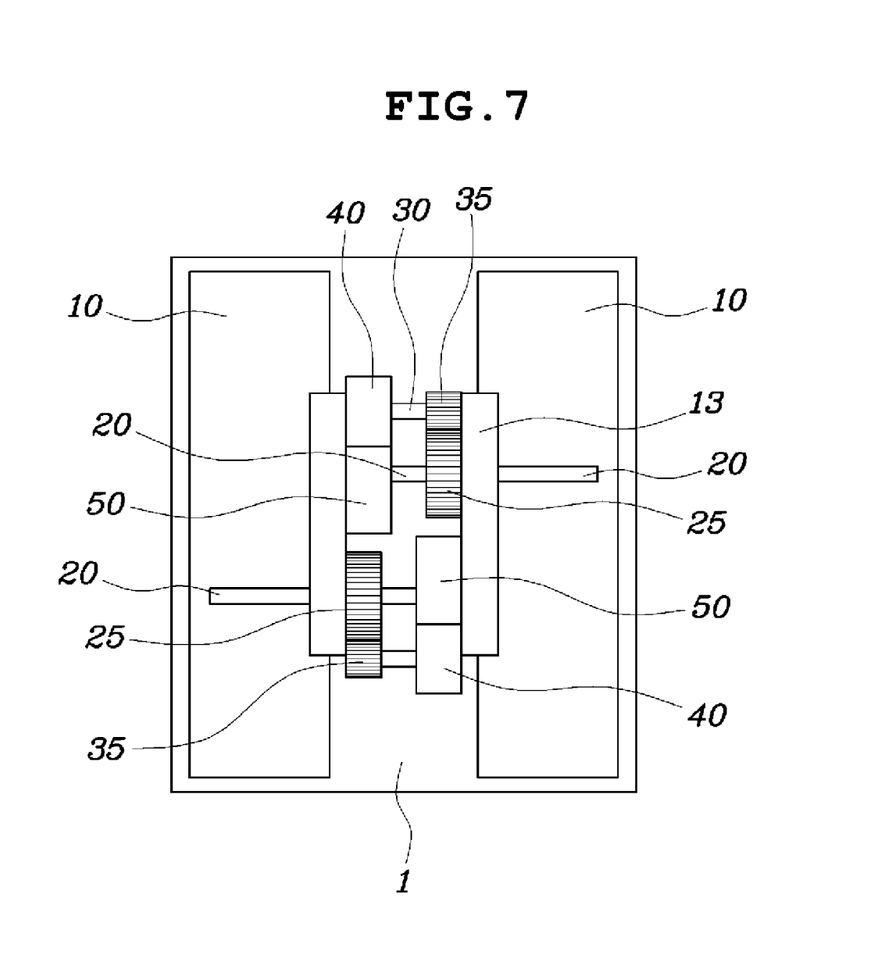
FIGS. 7 and 8 are schematic sectional views showing the use of the width control device according to the present invention.
Figure 8:
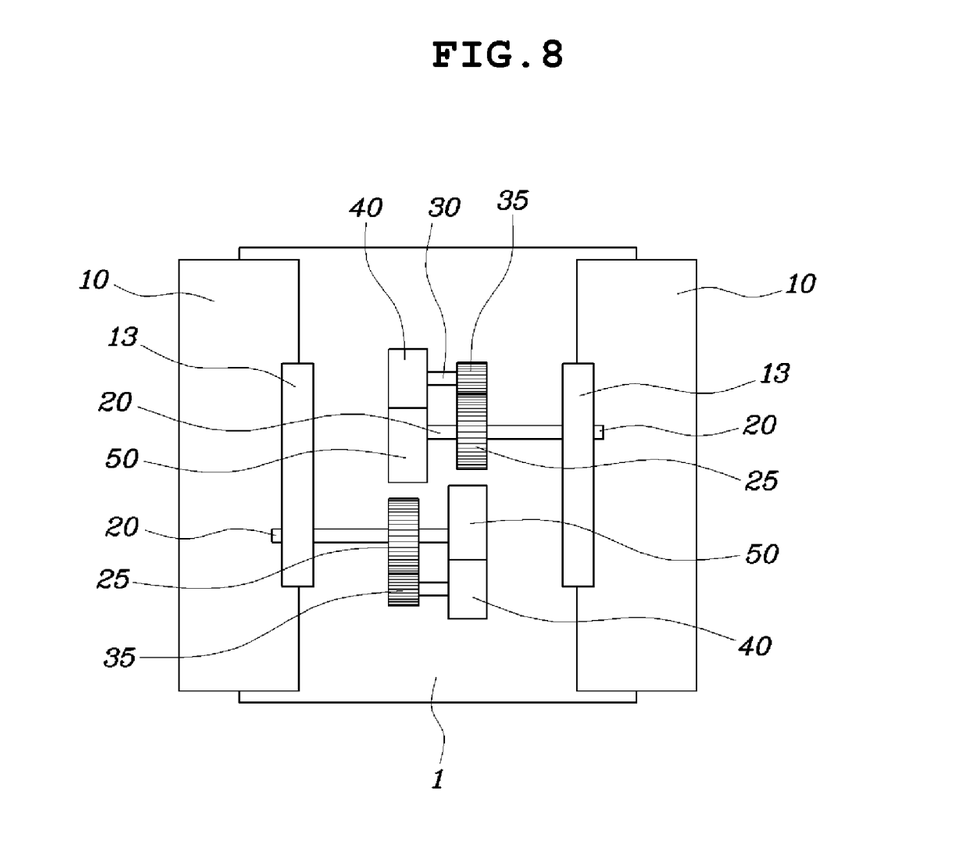

FIG. 2 is an exemplary schematic perspective view illustrating the width control device of the armrest for vehicles, according to preferred embodiments of the present invention. FIG. 3 is an exemplary schematic view illustrating the installation of a switch of the width control device according to certain preferred embodiments of the present invention. FIG. 4 is a perspective view illustrating the operation of the width control device according to other preferred embodiments of the present invention. FIG. 5 is an exemplary schematic sectional view illustrating the operation of a sensor of the width control device according to other certain preferred embodiments of the present invention. FIG. 6 is an exemplary sectional view illustrating a guide member of the width control device according to further preferred embodiments of the present invention. FIGS. 7 and 8 are exemplary schematic sectional views showing the use of the width control device according to other preferred embodiments of the present invention.

As described herein and as shown in the drawings, the width control device according to preferred embodiments of the present invention, which is suitably installed in the seat of a vehicle to adjust, preferably to automatically adjust, the width of the armrest of the seat, preferably includes a subsidiary armrest 10, a screw bar 20, a rotating shaft 30, a motor 40, a support member 50, a switch 60, a sensor 70 and a guide member 80, although is not limited only to these elements. According to preferred embodiments of the invention, the detailed constructions of these elements are as follows.

As shown in FIGS. 7 and 8, in preferred embodiments, the subsidiary armrest 10 is suitably provided in each of the opposite sides of a main armrest 1 so as to be slidable in leftward and rightward directions of the main armrest 1. The subsidiary armrest 10 is preferably supported by a support plate 13. In further embodiments, the support plate 13 is preferably moved in the leftward or rightward direction by rotation of the screw bar 20, thereby suitably being moved in a direction away from or towards the main armrest 1, with the result that the subsidiary armrest 10 is suitably extracted from or retracted into the main armrest 1.

In further preferred embodiments, rollers 15 are provided in the lower end of the subsidiary armrest 10 to make the movement of the subsidiary armrest 10 suitably smooth when the subsidiary armrest 10 is moved in a leftward or rightward direction. Accordingly, when the subsidiary armrest 10 is extracted from or retracted into the main armrest 1, it can be suitably smoothly actuated.

In other preferred embodiments, for example in the case where the present invention is provided with a function of automatically controlling the distance by which the subsidiary armrest 10 slides in a leftward or rightward direction, the movement of the subsidiary armrest 10 can be preferably automatically controlled in response to the body type of a passenger.

In further related embodiments, after the width of the armrest suitable for the passenger is previously set, when the main armrest 1 is converted from a retracted (upright) state into an extracted (horizontal) state, the width of the armrest, for example, the positions of the subsidiary armrests, are suitably automatically controlled. In further embodiments, this function can be suitably realized, for example, by the sensor 70, and is provided in the lower surface of the main armrest 1 to suitably sense the position of the main armrest 1 when it is rotated upwards or downwards.

In still other preferred embodiments, the screw bar 20 is preferably rotated by the rotation of a first gear 25, which receives rotating force from the motor 40 through a second gear 35, and thus serves to push the subsidiary armrest 10 in a direction away from the main armrest 1 or to pull it towards the main armrest 1.

Preferably, the screw bar 20 is rotatably coupled to the support plate 13, which suitably supports the subsidiary armrest 10 such that the subsidiary armrest 10 is movable. Accordingly, in related embodiments, the screw bar 20 rotates with respect to the support plate 13 in the state in which it is suitably supported by the support plate 13, thus preferably moving the subsidiary armrest 10 in the direction in which it is extracted from or retracted into the main armrest 1.

In further preferred embodiments, the screw bar 20 is suitably supported by a bearing, which is preferably provided in the support member 50 to make the rotation of the screw bar 20 suitably smooth.

Preferably, in further embodiments, the rotating shaft 30 is provided with the second gear 35, which engages with the first gear 25 of the screw bar 20 to rotate the first gear 25, and thus serves to suitably transmit the rotating force of the motor 40 to the first gear 25.

According to preferred embodiments, for example as shown in FIG. 4, when the motor 40 is operated, the second gear 35 of the rotating shaft 30 and the first gear 25 of the screw bar 20, which engage with each other, preferably rotate in conjunction with each other, thus rotating the screw bar 20 in one direction such that the subsidiary armrest 10 is suitably extracted from or retracted into the main armrest 1.

In related embodiments, the motor 40 reversibly rotates the rotating shaft 30 such that the subsidiary armrest 10 can be suitably extracted from or retracted into the main armrest 1.

According to further embodiments, for example as shown in FIG. 2, the motor 40 is suitably mounted to the support member 50 using a bracket 55, which is provided therebetween.

Preferably, the support member 50 is fixed to the main armrest 1 and serves to suitably support the screw bar 20 and the motor 40. In other further embodiments, the support member 50 preferably has the bearing therein to rotatably support the screw bar 20.

According to further embodiments, for example as shown in FIG. 3, the switch 60 is suitably provided on the front part of the main armrest 1 to allow the passenger to control the extraction or retraction of the subsidiary armrest 10. Preferably, according to further embodiments, the switch 60 has two buttons, which individually operate the two respective subsidiary armrests 10, which are preferably provided in the main armrest 1. According to further embodiments, it is preferable that each button of the switch 60 have a seesaw type structure for convenience of operation.

In other related embodiments, for example to avoid an inconvenience when the subsidiary armrests 10 are retracted into the main armrest 1 after they has been extracted therefrom, the width of the subsidiary armrests 10 can be manually controlled, the present invention in certain preferred embodiments may be provided with a sensor and be suitably designed such that the subsidiary armrests 10 are automatically retracted into the main armrest 1 using the sensor.

According to further related embodiments, for example as shown in FIG. 5, the sensor 70 is suitably provided in the lower surface of the main armrest 1 to detect the event where the main armrest 1 is spaced apart from a seat bottom 2 by a suitably predetermined distance and to automatically reduce the width of the subsidiary armrests 10.

For example, according to preferred embodiments, the sensor 70 is set such that, when the main armrest is moved away from the seat bottom 2 by a distance of 5 cm, 10 cm, 15 cm, 20 cm or more, in certain preferred embodiments by a distance of 10 cm, the subsidiary armrests 10 are automatically retracted into the main armrest.

According to further embodiments, for example as shown in FIG. 6, the guide member 80 is fastened to the main armrest 1 and preferably serves to support and guide the subsidiary armrests 10, such that, when the subsidiary armrests 10, which are movably provided on the opposite sides of the main armrest 1, are extracted from the main armrest 1, the subsidiary armrests 10 can maintain correct positions relative to each other.

According to further embodiments, for example as shown in FIG. 7, in the state in which the subsidiary armrests 10 are preferably disposed inside the main armrest 1, when the buttons of the switch 60 shown in FIG. 3 are suitably pushed in corresponding directions, power is preferably applied to the device, and the motors 40 are thus operated.

Preferably, when the motors 40 are operated, the rotating shafts 30 and the second gears 35 are rotated together. According to further embodiments, simultaneously, the first gears 25 of the screw bars 20, which engage with the respective second gears 35, are suitably rotated.

According to further embodiments, the screw bars 20 are rotated by the rotation of the respective first gears 25, thus suitably pushing the corresponding support plates 13, which are provided on the inner surfaces of the respective subsidiary armrests 10, outwards. Accordingly, as a result, for example as shown in FIG. 8, the subsidiary armrests 10 are suitably extracted from the main armrest 1.

In related embodiments, the subsidiary armrests 10 can smoothly move outwards using the rollers 15, which are suitably provided at left and right positions in the lower ends of the subsidiary armrests 10.

In further preferred embodiments, when the subsidiary armrests 10 are suitably extracted from the main armrest 1, the subsidiary armrests 10 are stably supported by the guide member 80, which is coupled at opposite ends thereof to the upper ends of the respective subsidiary armrests 10.

In other certain embodiments, to preferably return the subsidiary armrests 10 from one state to another, for example from the state of FIG. 8 to the state of FIG. 7, in which the armrests have been extracted from the main armrest 1, to their original positions, the user preferably manipulates the switch 60 such that the motors 40 are suitably rotated in reverse directions. In further related embodiments, for example as shown in FIG. 5, in examples wherein the present invention is preferably provided with the sensor 70, which senses the distance by which the armrest 1 is spaced apart from the seat bottom 2, when the subsidiary armrests 10 are retracted into the main armrest 1, the motor 40 is suitably rotated under the command of the switch 60 or the sensor 70 in a direction opposite the direction in which the motor 40 is rotated when the subsidiary armrests 10 are extracted. Accordingly, the subsidiary armrests 10 are retracted into the main armrest 1.

As described herein, the present invention provides a width control device of an armrest for vehicles which is suitably constructed such that any user who sits on a seat can conveniently place his/her arm on the armrest regardless of the body type of the user. The invention as described herein considerably enhances the comfort of the passenger in the vehicle.

Although a preferred embodiment of the present invention has been disclosed for illustrative purposes, the present invention is not limited to the embodiment. Furthermore, those skilled in the art will appreciate that various modifications, additions and substitutions are possible, without departing from the scope and spirit of the invention as disclosed in the accompanying claims. These modifications, additions and substitutions must be regarded as falling within the bounds of the claims.

What is claimed is:

1. A width control device of an armrest for vehicles, comprising:
    a main armrest provided at a center position in a rear seat so as to be rotatable between an upright position and a horizontal position;
    subsidiary armrests provided in respective opposite sides of the main armrest so as to be slidable in opposite directions based on the main armrest, each of the subsidiary armrests being supported by a support plate;
    a screw bar to push or pull each of the subsidiary armrests depending on rotation of a first gear;
    a rotating shaft provided with a second gear engaging with the first gear of the screw bar to rotate in conjunction with the first gear;
    a reversible motor to reversibly rotate the rotating shaft;
    a support member fastened to the main armrest for supporting the screw bar and the reversible motor; and a switch provided in a front part of the main armrest to control extraction or retraction of the subsidiary armrests from or into the main armrest.

2. The width control device as set forth in claim 1, further comprising:
a roller provided in a lower end of each of the subsidiary armrests.

3. The width control device as set forth in claim 1, wherein the support member comprises a bracket for supporting the reversible motor.

4. The width control device as set forth in claim 1, further comprising:
a sensor provided in a lower end of the main armrest to automatically retract the subsidiary armrests into the main armrest when the main armrest is moved away from a bottom of the seat by a predetermined distance.

5. The width control device as set forth in claim 4, wherein the sensor is set such that, when the main armrest is moved away from the bottom of the seat by a distance of 10 cm or more, the subsidiary armrests are retracted into the main armrest.

6. The width control device as set forth in claim 1, further comprising:
a guide member to support and guide the subsidiary armrests when the subsidiary armrests, which are movably provided on the respective opposite sides of the main armrest, are extracted from the main armrest.

7. The width control device as set forth in claim 1, further comprising:
a bearing provided in the support member to rotatably support the screw bar.

8. A width control device of an armrest for vehicles, comprising:
a main armrest;
subsidiary armrests provided in respective opposite sides of the main armrest;
a screw bar to push or pull each of the subsidiary armrests depending on rotation of a first gear;
a rotating shaft;
a reversible motor to reversibly rotate the rotating shaft;
a support member; and
a switch provided in a front part of the main armrest to control extraction or retraction of the subsidiary armrests from or into the main armrest.

9. A motor vehicle comprising the width control device of an armrest of claim 8.

10. The width control device of an armrest for vehicles of claim 8, wherein the main armrest is provided at a center position in a rear seat so as to be rotatable between an upright position and a horizontal position.

11. The width control device of an armrest for vehicles of claim 8, wherein the rotating shaft is provided with a second gear engaging with the first gear of the screw bar to rotate in conjunction with the first gear.

12. The width control device of an armrest for vehicles of claim 8, wherein the support member is fastened to the main armrest for supporting the screw bar and the reversible motor.

13. A motor vehicle comprising the width control device of an armrest of claim 1.

* * * * *